D. F. HACKER.
Horse Hay-Rake.
No. 210,026. Patented Nov. 19, 1878.
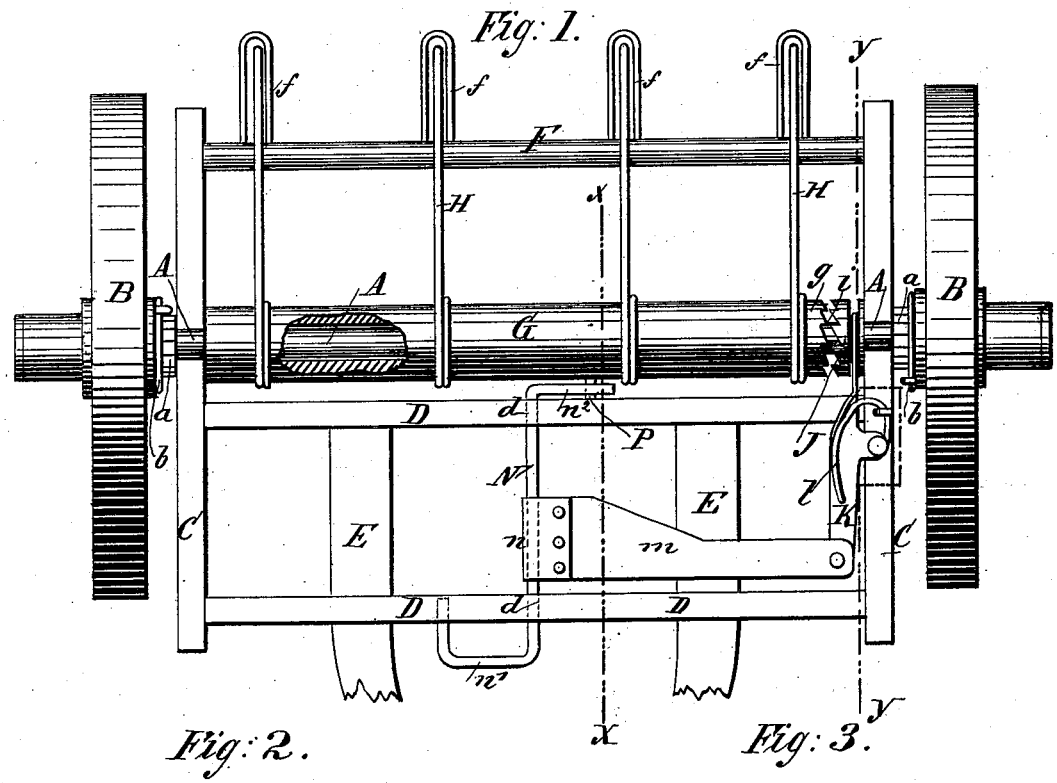
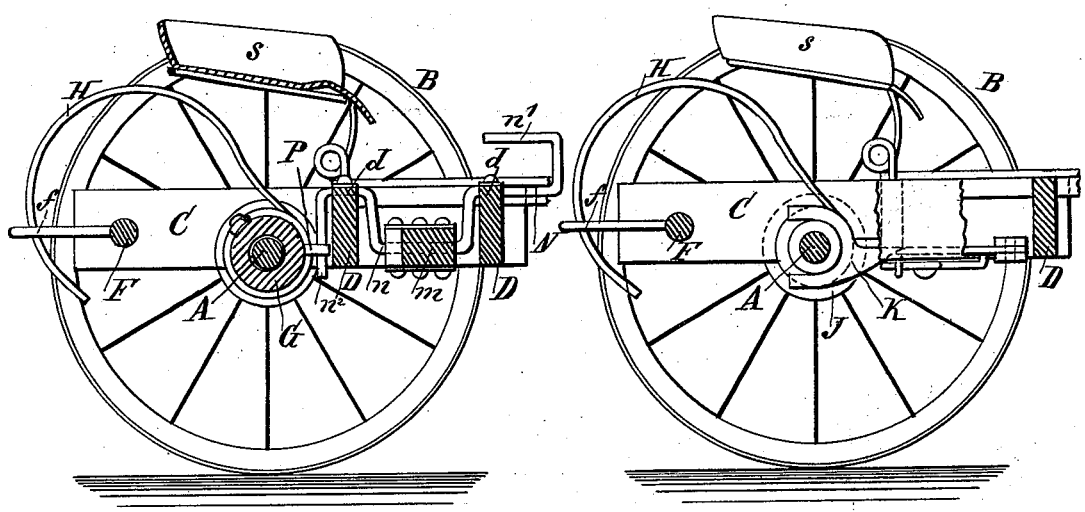
WITNESSES:
Achilles Sehehl.
C. Sedgwick
INVENTOR:
D. F. Hacker
BY Munn & Co
ATTORNEYS.

UNITED STATES PATENT OFFICE.

DAVID F. HACKER, OF KEMPTON, INDIANA, ASSIGNOR TO HIMSELF, VINCENT C. BOOTH, AND ELISHA BOOTH, OF SAME PLACE.

IMPROVEMENT IN HORSE HAY-RAKES.

Specification forming part of Letters Patent No. 210,026, dated November 19, 1878; application filed August 12, 1878.

*To all whom it may concern:*

Be it known that I, DAVID FOX HACKER, of Kempton, in the county of Tipton and State of Indiana, have invented a new and useful Improvement in Horse Hay-Rakes, of which the following is a specification:

The invention will first be described in connection with the drawings, and then pointed out in the claim.

The accompanying drawings represent a rake embodying my improvements, Figure 1 being a bottom view; Fig. 2, a section taken in the line $x\,x$ of Fig. 1; and Fig. 3, a section taken in the line $y\,y$ of Fig. 1.

A represents the axle; B B, the wheels; C C, the end bars of the frame of the machine; D D, the front bars of said frame; and E E, the shafts or thills.

The wheels B B are attached to the axle A by means of spring-pawls $b\,b$ on the hubs engaging with ratchets $a\,a$ fixed to the axles, so that when the machine is moving in a forward direction the axle will turn with the wheels, but when moving in a backward direction the wheels will turn independently of the axle.

Surrounding the axle A is a loose sleeve, G, to which the rake-teeth H are attached. Each tooth is composed of a wire rod, having one end secured to the sleeve G, then wound once or more around the sleeve, and then bent into the usual hook form. The rear portions of the teeth H work in guard-staples $f$, carried by a rod, F, which connects the rear ends of the bars C C of the frame.

At one end of the sleeve G is a ratchet, $g$, which forms one-half of a clutch, the other half of which is formed by a corresponding series of teeth, $i$, on a collar, J, carried by the axle A, and attached thereto by a groove and feather, so as to turn therewith, but be allowed to slide thereon.

To one of the bars C of the frame is pivoted a forked lever, K, provided with a spring, $l$. The forked short arm of this lever engages with a peripherical groove on the collar J, and its long arm is connected by a bar, $m$, with a treadle, N, consisting of a piece of stout round rod-iron bent midway of its length in somewhat the form of a loop or stirrup, and having its ends bent in opposite directions at about right angles with said loop. It is then hung in bearings in the two front bars, D D, of the frame, so that the loop or stirrup portion $n$ will lie between said bars and the end portions will extend in opposite directions outside thereof—one in front of the foremost bar and the other in rear of the rearmost one. It thus constitutes what may be called a "double-acting lever," having two long arms, $n^1\,n^2$, two fulcrums, $d\,d$, and but one short arm, $n$, the loop or stirrup portion constituting said short arm. When the long arm $n^1$ is depressed the connecting-bar $m$ pushes on the lever K, so as to throw the clutch $g\,i$ into engagement and cause the sleeve G to turn with the axle A and raise the teeth H. When the long arm $n^2$ is depressed the connecting-bar $m$ pulls on the lever K, so as to throw the clutch $g\,i$ out of engagement and allow the teeth H to drop.

The depression of the arm $n^1$ is effected by the foot of the driver, who occupies the seat $s$. The depression of the opposite arm, $n^2$, is effected automatically by means of a projecting pin, P, on the sleeve G.

When the machine is moving in a forward direction the teeth H are allowed to drag on the ground until they have collected a sufficient quantity of hay or stalks to form a windrow of the desired size. The driver then with his foot depresses the long arm $n^1$ of the lever N, so as to lift the teeth H, as before described, and raise them clear of the windrow. As soon as the pin P reaches the long arm $n^2$ and depresses it the clutch $g\,i$ is disengaged and the teeth H are allowed to drop to collect another windrow.

Having thus described my invention, I claim as new and desire to secure by Letters Patent—

In a horse-rake, the combination, with revolving axle A, of the loose surrounding rake-head G, having teeth $g$ at one end, the sliding sleeve keyed to the shaft and having teeth $i$, and the treadle mechanism K $m$ N, as and for the purpose specified.

DAVID FOX HACKER.

Witnesses:
LEWIS T. VAWTER,
GEORGE W. EPPERSON.